United States Patent
Kang et al.

(10) Patent No.: US 12,370,949 B2
(45) Date of Patent: Jul. 29, 2025

(54) ELECTRIC FOLDING DEVICE FOR EXTERIOR REAR-VIEW MIRROR OF VEHICLE

(71) Applicant: NINGBO JINGCHENG CAR INDUSTRY CO., LTD., Ningbo (CN)

(72) Inventors: Mingzhang Kang, Ningbo (CN); Heng Wan, Ningbo (CN); Zhengdong Jiang, Ningbo (CN)

(73) Assignee: NINGBO JINGCHENG CAR INDUSTRY CO., LTD., Ningbo (CN)

( * ) Notice: Subject to any disclaimer, the term of this patent is extended or adjusted under 35 U.S.C. 154(b) by 0 days.

(21) Appl. No.: 18/035,788

(22) PCT Filed: Oct. 26, 2021

(86) PCT No.: PCT/CN2021/126280
§ 371 (c)(1),
(2) Date: May 8, 2023

(87) PCT Pub. No.: WO2022/095749
PCT Pub. Date: May 12, 2022

(65) Prior Publication Data
US 2023/0415650 A1   Dec. 28, 2023

(30) Foreign Application Priority Data

Nov. 9, 2020 (CN) .......................... 202011237213.8

(51) Int. Cl.
*B60R 1/074* (2006.01)
(52) U.S. Cl.
CPC .................................. *B60R 1/074* (2013.01)
(58) Field of Classification Search
CPC ............ B60R 1/06; B60R 1/074; B60R 1/076
See application file for complete search history.

(56) References Cited

U.S. PATENT DOCUMENTS

| 6,390,630 B1 * | 5/2002 | Ochs ....................... B60R 1/074 |
| | | 248/478 |
| 9,987,987 B2 * | 6/2018 | van Stiphout ............ B60R 1/06 |

(Continued)

FOREIGN PATENT DOCUMENTS

| CN | 108297798 A * | 7/2018 | ............... B60R 1/07 |
| CN | 210284083 U * | 4/2020 | |

(Continued)

OTHER PUBLICATIONS

PCT International Search Report mailed Jan. 19, 2022 in corresponding PCT application PCT/CN2021/126280, 2 pages in English.

*Primary Examiner* — Terrell L McKinnon
*Assistant Examiner* — Ding Y Tan
(74) *Attorney, Agent, or Firm* — Juan Carlos A. Marquez; Marquez IP Law Office, PLLC

(57) ABSTRACT

An electric folding device for exterior rear-view mirror of a vehicle is provided which comprises a centralized connection piece, having a mounting portion provided for the drive gear to slide circumferentially; a limiting seat is integrally disposed on an upper part of the mounting portion, a spring is abutted against an upper end of the limiting seat; the drive gear is abutted between the limiting seat and the base. In an initial state, a reserved gap is present between the drive gear and the limiting seat/the base; the electric drive unit drives the base cam assembly to gradually slide relative to the seat cam assembly; the reserved gap is gradually eliminated until the base cam assembly is abutted against the seat cam assembly as the base is lifted up, achieving a smooth lifting function, with low requirements for the bearing capacity of gear, suitable for lightweight development, and cost-effective.

9 Claims, 14 Drawing Sheets

(56) References Cited

U.S. PATENT DOCUMENTS

| | | | | |
|---|---|---|---|---|
| 11,396,264 | B2* | 7/2022 | Peterson | B60R 1/074 |
| 12,240,383 | B2* | 3/2025 | Hamming | B60R 1/076 |
| 2005/0000058 | A1* | 1/2005 | Kleissen | B60R 1/074 16/235 |
| 2007/0035862 | A1* | 2/2007 | Brouwer | B60R 1/074 359/841 |
| 2007/0084707 | A1* | 4/2007 | van den Brink | B60R 1/074 359/877 |
| 2013/0321941 | A1* | 12/2013 | van Stiphout | B60R 1/074 359/877 |
| 2017/0232900 | A1* | 8/2017 | Fuchs | F16H 1/203 359/841 |
| 2017/0232901 | A1* | 8/2017 | Schadler | B60R 1/074 359/841 |
| 2018/0287454 | A1* | 10/2018 | Motomiya | B60R 1/074 |
| 2018/0354421 | A1* | 12/2018 | Alabern | B60R 1/074 |
| 2019/0061627 | A1* | 2/2019 | Lescroart | B60R 1/076 |
| 2021/0046874 | A1* | 2/2021 | Harris | B60R 1/06 |
| 2022/0144170 | A1* | 5/2022 | Martin Pina | B60R 1/074 |
| 2022/0219608 | A1* | 7/2022 | Hamming | B60R 1/076 |
| 2023/0078474 | A1* | 3/2023 | Roose | F16H 1/16 359/841 |

FOREIGN PATENT DOCUMENTS

| | | | | | |
|---|---|---|---|---|---|
| CN | 112092733 | A | | 12/2020 | |
| CN | 112622768 | A | | 4/2021 | |
| EP | 3653442 | A1 | * | 5/2020 | ............ B60R 1/074 |
| JP | 2002036955 | A | | 2/2002 | |
| WO | WO-2005075250 | A1 | * | 8/2005 | ............ B60R 1/074 |
| WO | WO-2017031953 | A1 | * | 3/2017 | ............ B60R 1/074 |
| WO | WO-2017074193 | A1 | * | 5/2017 | ............ B60R 1/074 |

\* cited by examiner

ELECTRIC FOLDING DEVICE FOR EXTERIOR REAR-VIEW MIRROR OF VEHICLE

TECHNICAL FIELD

The present disclosure relates to the field of exterior rear-view mirrors of vehicles, and in particular to an electric folding device for exterior rear-view mirror of a vehicle.

BACKGROUND

The exterior rear-view mirrors of vehicles are accessories of a vehicle for drivers to observe movements of vehicles and pedestrians behind the vehicle during a travel process, so as to ensure travel safety. By adjusting a mounting angle of the outside rear-view mirror, the driver can observe a field of view in a specific direction, ensuring safe travel. Furthermore, the importance of the outside rear-view mirrors is well known. Since the outside rear-view mirrors are mounted at both sides of vehicles, an electric folding device is usually used for the outside rear-view mirrors to prevent collision of the outside rear-view mirrors with other vehicles or pedestrians in a complex scene of narrow spaces, or many pedestrians, thus avoiding vehicle damages or unnecessary disputes. The electric folding device is usually rotatably mounted between the mirror baseplate and the mirror bracket fixed on the vehicle to perform the folding function. In order to reduce a frictional resistance between the mirror baseplate and the mirror bracket during electric folding process, a gap is usually reserved between the mirror baseplate and the mirror bracket during the design of the rear-view mirror. But, if there is gap reserved, the mirror bracket no longer supports the lower end surface of the mirror baseplate. This is equivalent to that the mirror baseplate is supported solely by the folding mounting shaft and pressed by the spring sleeved on the mounting shaft, resulting in poor anti-shake performance. During a travel process, especially at a high speed or on a bumpy road, shake is easy to occur. Furthermore, if there is a gap reserved, wind noise will be increased during a travel process. Since the mirror baseplate and the mirror bracket are made with a plastic by injection molding, the material will age over a long time of use. Coupled with the factors such as windy sands or the like, rotational resistance may appear and the motor requires an excessively high current during operation, resulting in folding failure and inability to fold to position and the like.

For the above, the prior invention patent CN 105034957B of the applicant provides an electric folding device for exterior rear-view mirror of a vehicle. Under the drive of electric drive unit, cam assemblies of the connection piece, the base and the seat can perform relative slide and the base is lifted up the mounting shaft under the elastic force of the spring. In other words, during electric folding, the base and the housing are firstly entirely lifted up, and the mirror baseplate is also lifted up along. However, this design has high requirements for the bearing capacity of the gear of the connection piece. For satisfying the strength requirements, the gear needs to be made with a better material such as powder metallurgy component, which is unfavorable for development toward lightness and low costs of the products.

SUMMARY

In order to address the above shortcomings, the present disclosure provides an electric folding device for exterior rear-view mirror of a vehicle which realizes lift function smoothly, has low requirements for bearing capacity for a gear, and is applicable to lightness development with low costs.

In order to solve the above problems, the present disclosure provides the technical solution: there is provided an electric folding device for exterior rear-view mirror of a vehicle comprising a housing, connected with a mirror baseplate;

a base, fixedly connected with the housing, and a base cam assembly is disposed on a lower end surface of the base;

a seat, fixed on a mirror bracket, and a seat cam assembly is disposed at an upper end of the seat, and in an initial state, the base cam assembly and the seat cam assembly are in engaged state;

a mounting shaft, fixedly connected with the seat, and the base and the housing rotate around an axis of the mounting shaft relative to the seat, and a spring is disposed on the mounting shaft;

an electric drive unit, comprising a motor, a transmission assembly and a drive gear disposed in an inner chamber of the housing; and a centralized connection piece, having a mounting portion provided for the drive gear to slide circumferentially; a limiting seat is integrally disposed on an upper part of the mounting portion, the spring is abutted against an upper end of the limiting seat, and the drive gear is abutted between the limiting seat and the base. In an initial state, a reserved gap is present between the drive gear and the limiting seat/the base. Under the drive of the electric drive unit, the base cam assembly gradually slides relative to the seat cam assembly. During this process, as the base is lifted up, the reserved gap is gradually eliminated until the base cam assembly runs on the seat cam assembly.

Compared with the prior arts, the present disclosure has the following advantages: when the folding device for a vehicular outside rear-view mirror folds electrically, since a reserved gap is formed by disposing a plurality of groups of limiting convex blocks mutually abutted between the drive gear and the limiting seat/the base, under the drive of the electric drive unit, the drive gear slides a distance along a circumference of the mounting portion of the centralized connection piece to release the abutting of the limiting convex blocks; then, the base cam assembly is enabled to slide relative to the seat cam assembly to gradually eliminate the reserved gap, so as to achieve upward lift of the base; where the reserved gap between the drive gear and the limiting seat/the base is a distance for lifting up the base. Initially, the reserved gap is locked up. When the rear-view mirror electrically folds, the drive gear firstly slides a distance along a circumference of the mounting portion of the centralized connection piece and then the base is slowly lifted up until the reserved gap is completely eliminated, so as to achieve the folding to position. Compared with the existing solution in which lift functionality is implemented by relative slide of the cam assemblies between the electric folder connection piece with lift function and the base/the seat, in the entire folding process of the technical solution of the present disclosure, the drive gear bears a relatively small force without any external additional impact, the motor requires a relatively small current, and the entire lift operation process of the base is relatively easy. Due to low bearing requirements for the drive gear, an ordinary plastic gear may be selected, helping lightness development of the product and reducing the costs.

Due to the lift functionality, the rear-view mirror applied by the present disclosure has the same advantages as the invention previously applied for by the applicant: in a case of electric folding, the base and the housing are both lifted upward entirely, namely, the mirror baseplate of the rear-view mirror is also lifted up. During a folding and rotation process, the mirror baseplate and the mirror bracket are separated by a distance, such that a rotational resistance therebetween will be smaller, and the folding process is smoother, eliminating the seizure problem and the problem of inability to fold to position. It is because of the electric lift functionality of the folding device that the mirror baseplate and the mirror bracket can be tightly attached together during the design of the rear-view mirror. In this case, the mirror bracket can achieve better supporting effect on the mirror baseplate and the mirror housing. During travel process, no shake problem will occur while wind noise is reduced.

As an improvement, the reserved gap is formed by disposing a plurality of groups of circumferentially-spaced-apart limiting convex blocks mutually abutted between the drive gear and the limiting seat and between the drive gear and the base.

As an improvement, a plurality of slide grooves are disposed at positions of the mounting portion corresponding to a plurality of limiting convex blocks, a plurality of slide blocks matching the slide grooves are disposed on an inner circumferential wall of the drive gear, and the slide blocks of the drive gear slide a preset distance along a circumference of the slide grooves of the mounting portion so as to achieve abutting release of several groups of limiting convex blocks.

As an improvement, the preset distance is greater than a width of each limiting convex block so as to help achieve abutting release of each group of limiting convex blocks.

As an improvement, a plurality of first limiting convex blocks are disposed in a spacing circumferentially on a lower end surface of the limiting seat, and a plurality of second limiting convex blocks are disposed correspondingly on an upper end surface of the drive gear. In an initial state, the first limiting convex blocks are abutted against the second limiting convex blocks such that a first reserved gap is formed between the limiting seat and the drive gear.

As an improvement, a plurality of third limiting convex blocks are disposed in a spacing circumferentially on an upper end surface of the base, and a plurality of fourth limiting convex blocks are disposed correspondingly on a lower end surface of the drive gear. In an initial state, the third limiting convex blocks are abutted against the fourth limiting convex blocks such that a second reserved gap is formed between the base and the drive gear.

As an improvement, when the base is lifted up, the second reserved gap is firstly eliminated and then the first reserved gap is eliminated.

As an improvement, a limiting seat cam assembly is further disposed on the lower end surface of the limiting seat, and a drive gear cam assembly matching the limiting seat cam assembly is disposed on the drive gear. In an initial state, the limiting seat cam assembly and the drive gear cam assembly are in a separated state; after the drive gear slides the preset distance L along a circumference of the mounting portion, the limiting seat cam assembly and the drive gear cam assembly are engaged with each other to lock the limiting seat and the drive gear.

As an improvement, a plurality of first convex block assemblies are disposed at a lower end of the mounting portion of the centralized connection piece and a plurality of second convex block assemblies are disposed on an upper end of the seat. In an initial state and an electrically-driven state, the first convex block assemblies and the second convex block assemblies are engaged with each other to lock the centralized connection piece and the seat.

As an improvement, a positioning mechanism is disposed on an upper end of the centralized connection piece, and the positioning mechanism comprises a plurality of tilted positioning blocks uniformly arranged along a circumference of the centralized connection piece. A positioning groove is disposed at an end of the positioning blocks, and elastic positioning columns cooperating with the positioning grooves to realize positioning are disposed in the inner chamber of the housing.

Figure 1:
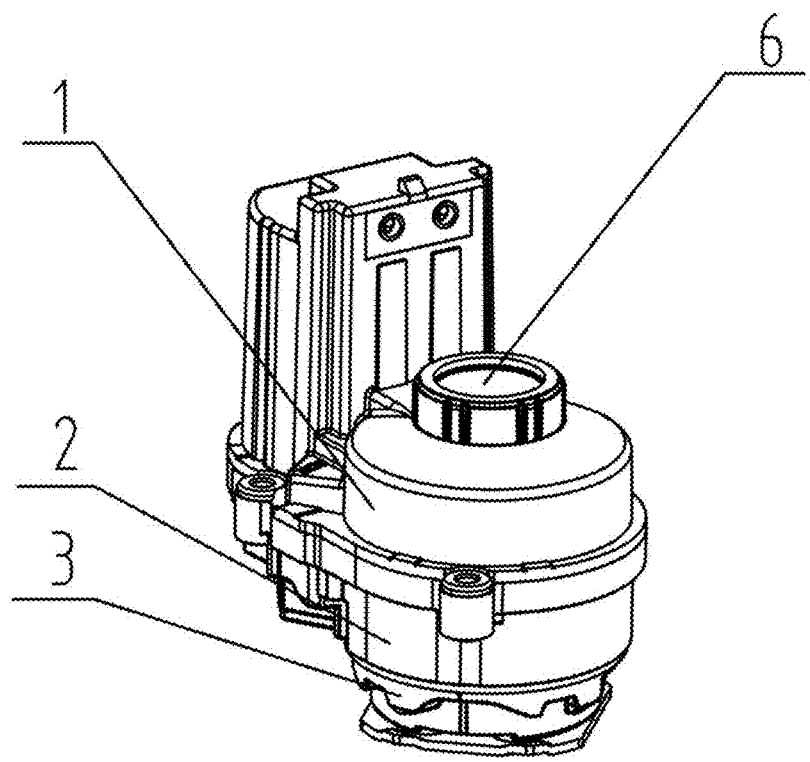
FIG. 1 is a schematic diagram illustrating an entire structure according to the present disclosure.

Numerals of the drawings are described as follows: 1. housing, 1.1 elastic positioning column, 2 base, 2.1 base cam assembly, 2.2 third limiting convex block, 3. seat, 3.1 seat cam assembly, 3.2 second convex block assembly, 4. electric drive unit, 4.1 motor, 4.2 transmission assembly, 4.3 drive gear, 4.3.1 slide block, 4.3.2 second limiting convex block, 4.3.3 fourth limiting convex block, 4.3.4 drive gear cam assembly, 4.4 module chamber, 5. centralized connection piece, mounting portion, 5.2 limiting seat, 6.3 slide groove, 5.4 first limiting convex block, 5.5 limiting seat cam assembly, 5.6 first convex block assembly, 5.7 positioning block, 5.8 positioning groove, 6. mounting shaft, 7. spring, 8. first reserved gap, and 9. second reserved gap.

DETAILED DESCRIPTIONS OF EMBODIMENTS

The embodiments of the present disclosure will be further described below in combination with the accompanying drawings.

As shown in FIGS. 1 to 9, there is provided an electric folding device for exterior rear-view mirror of a vehicle comprising: a housing 1 connected to a mirror baseplate.

A base 2 is fixedly connected with the housing 1, and a base cam assembly 2.1 is disposed at a lower end surface of the base 2.

A seat 3 is fixed on a mirror bracket and a seat cam assembly 3.1 is disposed on an upper end of the seat 3. In an initial state, the base cam assembly 2.1 is engaged with the seat cam assembly 3.1, and the base cam assembly 2.1 slides gradually relative to the seat cam assembly 3.1 under the drive of an electric drive unit 4 until the base cam assembly 2.1 runs on the seat cam assembly 3.1. The base cam assembly 2.1 and the seat cam assembly 3.1 are coupled through an L-shaped convex block and an L-shaped groove and other cooperation structures of convex block and groove of different widths to not only satisfy a fool-proofing and reinforcing engagement relationship between the base 2 and the seat 3 but also prevent failure of a particular group of worn-out cams of the base cam assembly 2.1 and the seat cam assembly 3.1.

A mounting shaft 6 is fixedly connected with the seat 3, and the base 2 and the housing 1 may rotate around an axis of the mounting shaft 6 relative to the seat 3. A spring 7 is disposed on the mounting shaft 6. An upper end of the spring 7 is fixed on the mounting shaft 6 and a lower end of the spring 7 is abutted against a centralized connection piece 5. The mounting shaft 6 provides a rotational axis for the rotation of the seat 3 and the base 2. A downward elastic force of the spring 7 is used to ensure stable cooperation among a drive gear 4.3, the centralized connection piece 5, the seat 3 and the base 2.

The electric drive unit 4 comprises a motor 4.1, a transmission assembly 4.2 and the drive gear 4.3 disposed in an inner chamber of the housing 1.

Figure 8:
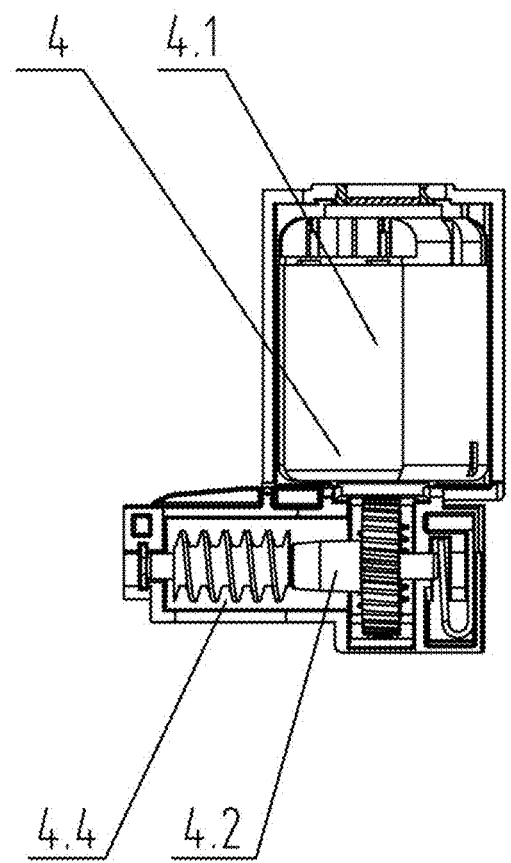
FIG. 8 is a structural schematic diagram illustrating an electric drive unit according to the present disclosure.

As shown in FIG. 8, in a specific embodiment, the drive gear 4.3 of the electric drive unit 4 is in transmission connection with the motor 4.1 through the transmission assembly 4.2, the motor 4.1 and the transmission assembly 4.2 both are disposed inside one module chamber 4.4, namely, the motor 4.1 and the transmission assembly 4.2 are disposed in a injection molding housing matching in shape with them, so as to form one module assembly. During assembling, the motor 4.1 and the transmission assembly 4.2 may be pre-mounted in the module chamber 4.4, and then entirely mounted into the housing 1, greatly reducing the mounting time and increasing the assembling efficiency. Furthermore, better positioning can be achieved for the motor 4.1 and the transmission assembly 4.2.

The folding device of the present disclosure further comprises the centralized connection piece 5 having a mounting portion provided for the drive gear 4.3 to circumferentially slide. A limiting seat 5.2 is integrally disposed on an upper part of the mounting portion 5.1. The spring 7 is abutted against an upper end of the limiting seat 5.2 and the drive gear 4.3 is abutted between the limiting seat 5.2 and the base 2. Further, in an initial state, a reserved gap is formed by disposing several groups of spaced-apart limiting convex blocks mutually abutted between the drive gear 4.3 and the limiting seat 5.2 and between the drive gear 4.3 and the base 2.

As shown in FIGS. 3, 4, 7, and 9, in a specific embodiment, a plurality of first limiting convex blocks 5.4 are disposed in a spacing circumferentially on a lower end surface of the limiting seat 5.2, and a plurality of second limiting convex blocks 4.3.2 are disposed correspondingly on an upper end surface of the drive gear 4.3. In an initial state, the first limiting convex blocks 5.4 are abutted against the second limiting convex blocks 4.3.2 such that a first reserved gap 8 is formed between the limiting seat 5.2 and the drive gear 4.3. A plurality of third limiting convex blocks 2.2 are disposed in a spacing circumferentially on an upper end surface of the base 2, and a plurality of fourth limiting convex blocks 4.3.3 are disposed correspondingly on a lower end surface of the drive gear 4.3. In an initial state, the third limiting convex blocks 2.2 are abutted against the fourth limiting convex blocks 4.3.3 such that a second reserved gap 9 is formed between the base 2 and the drive gear 4.3. The first reserved gap 8 and the second reserved gap 9 are formed into a reserved gap, i.e. a distance for the base to lift. Generally, the first reserved gap 8 is designed as 0.5-1 mm and the second reserved gap 9 is designed as 0.5-1 mm. Both ends of each limiting convex block have a tilted edge respectively to achieve smooth transition during relative movement.

Figure 3:
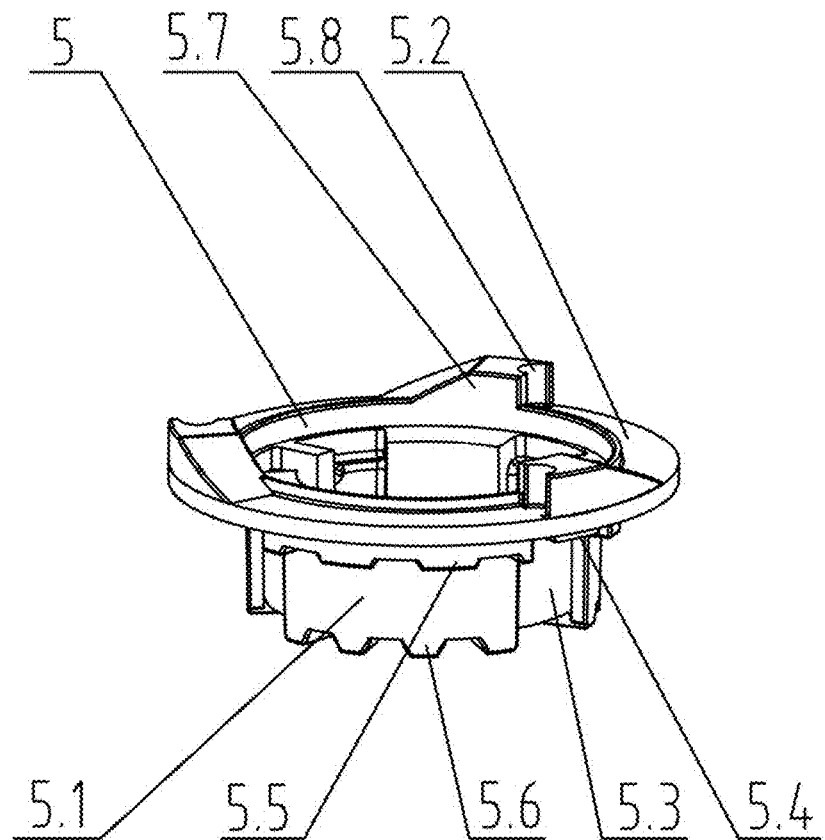
FIG. 3 is a structural schematic diagram illustrating a centralized connection piece according to the present disclosure.
Figure 4:
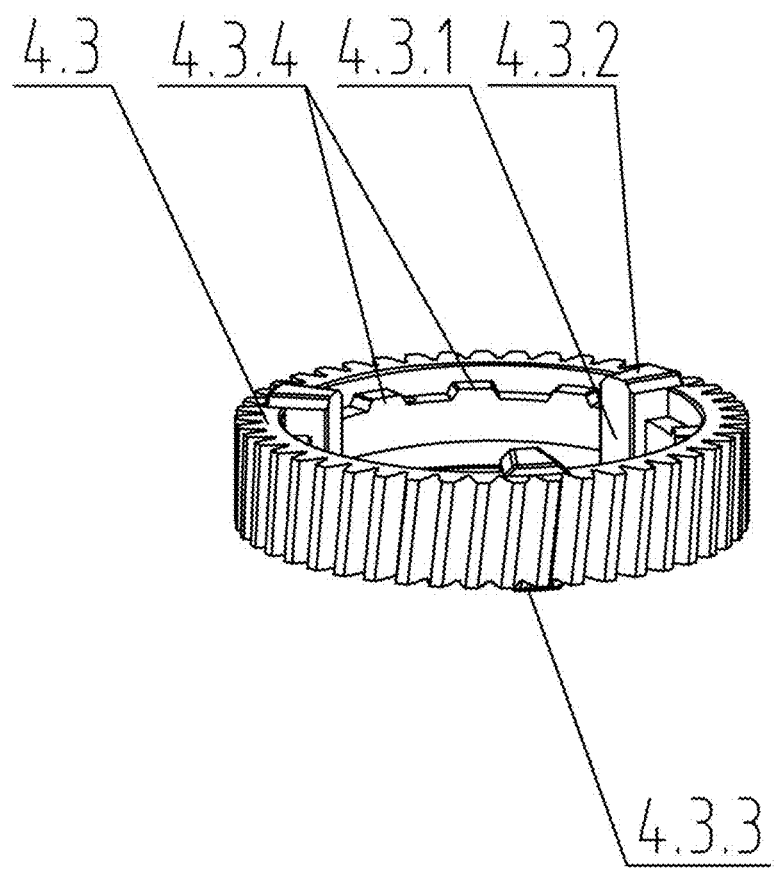
FIG. 4 is a structural schematic diagram illustrating a drive gear according to the present disclosure.
Figure 5:
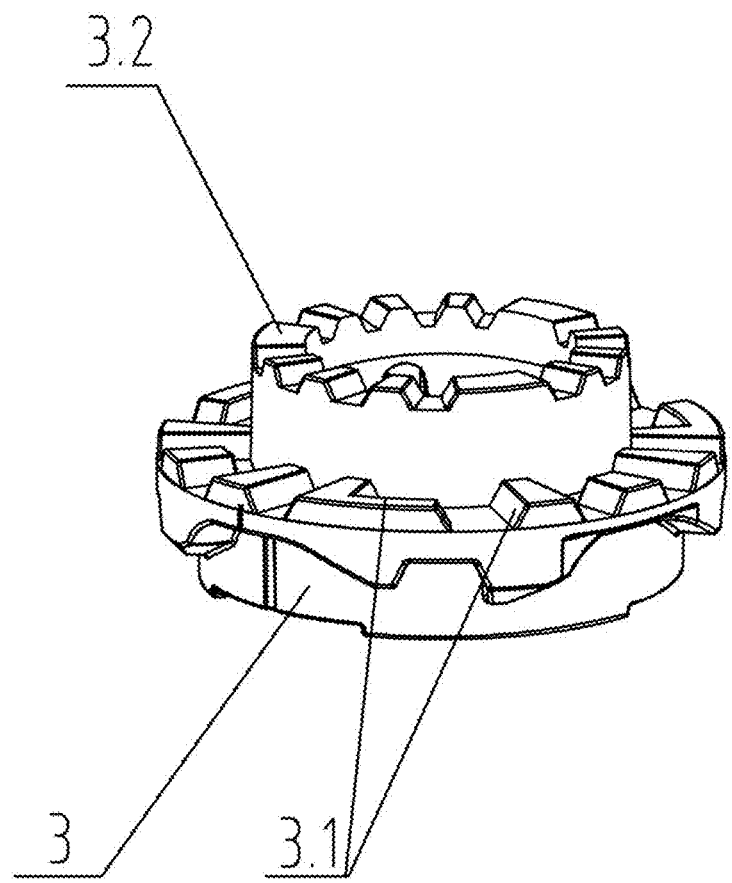
FIG. 5 is a structural schematic diagram illustrating a seat according to the present disclosure.
Figure 6:
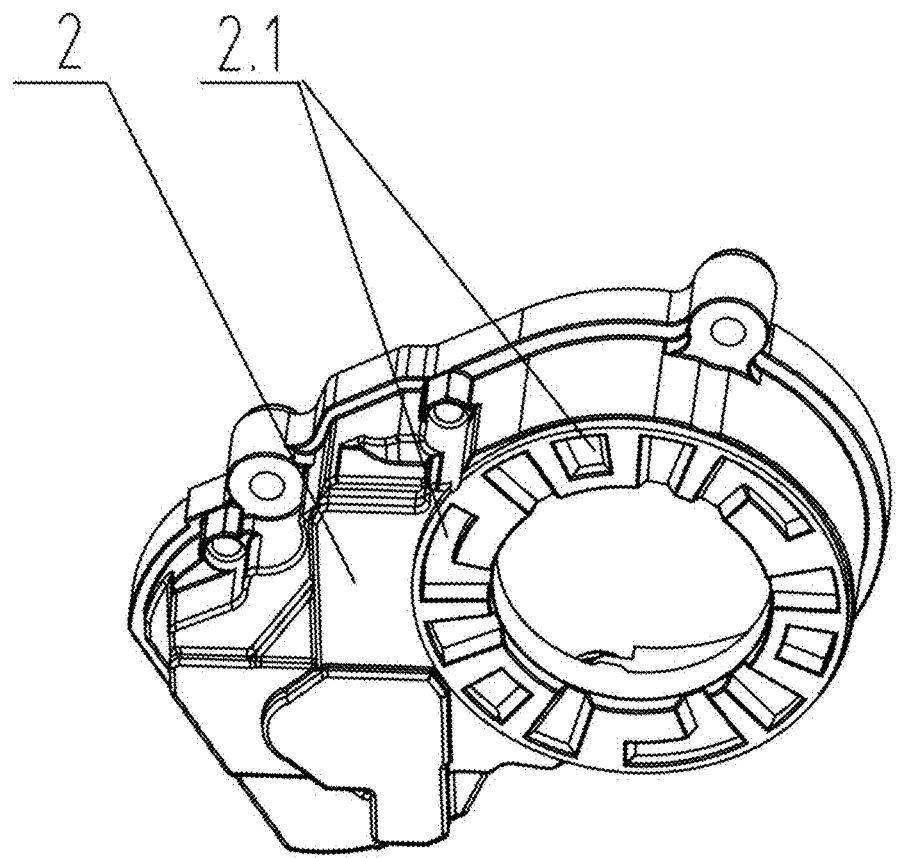
FIG. 6 is a structural schematic diagram illustrating a side of a base according to the present disclosure.
Figure 7:
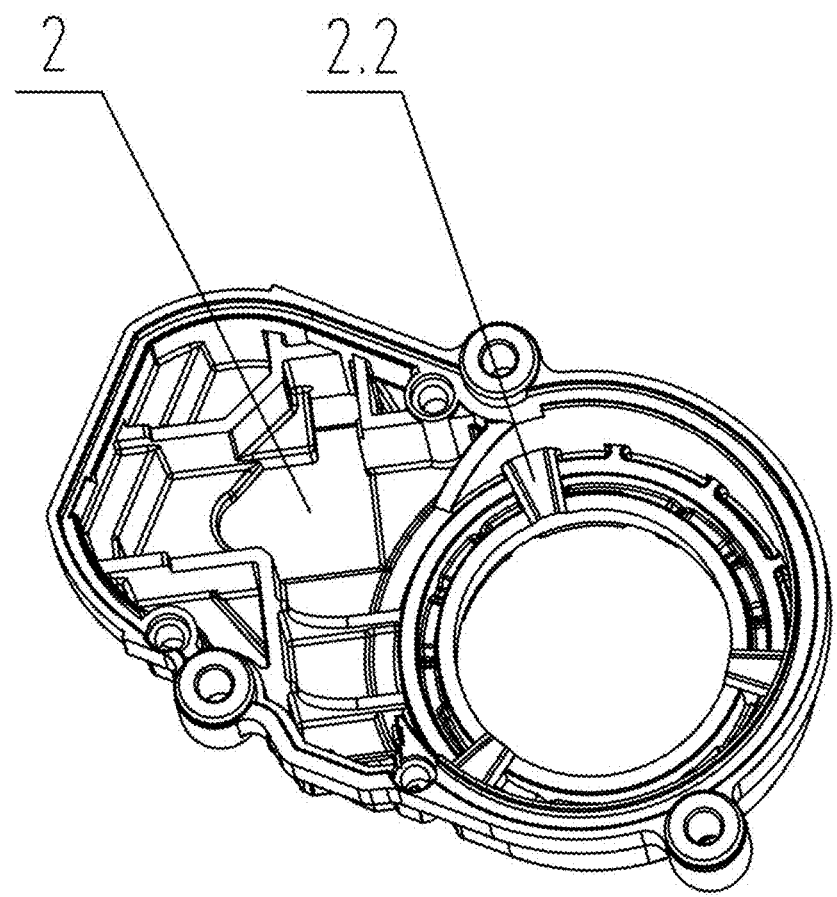
FIG. 7 is a structural schematic diagram illustrating another side of a base according to the present disclosure.
Figure 9:
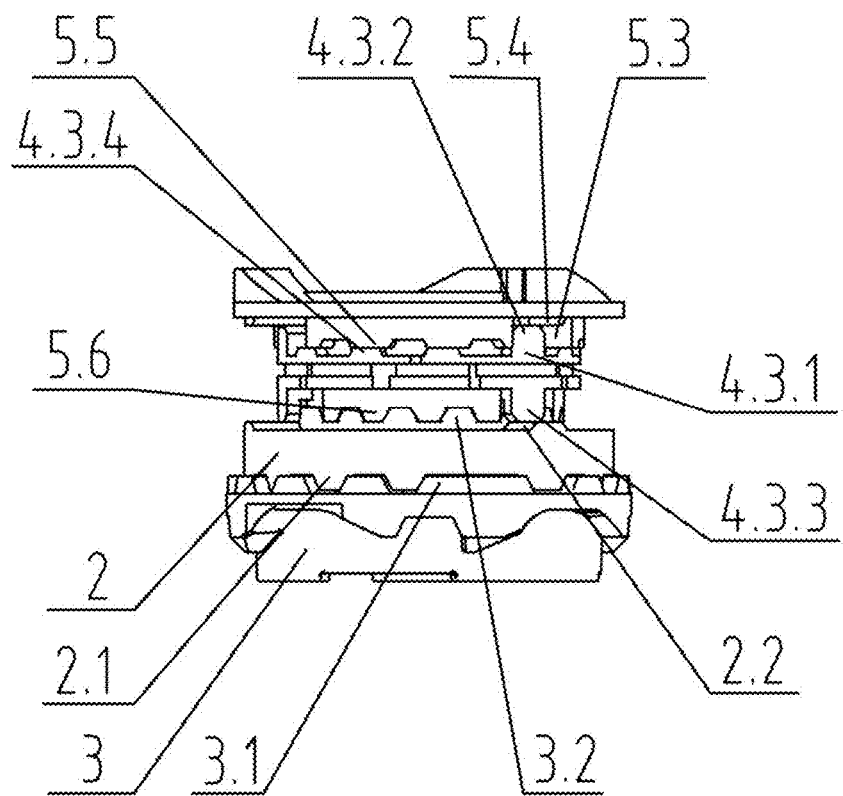
FIG. 9 is a schematic diagram illustrating a connection structure of the centralized connection piece, the drive gear, the seat and the base according to the present disclosure.
Figure 10:
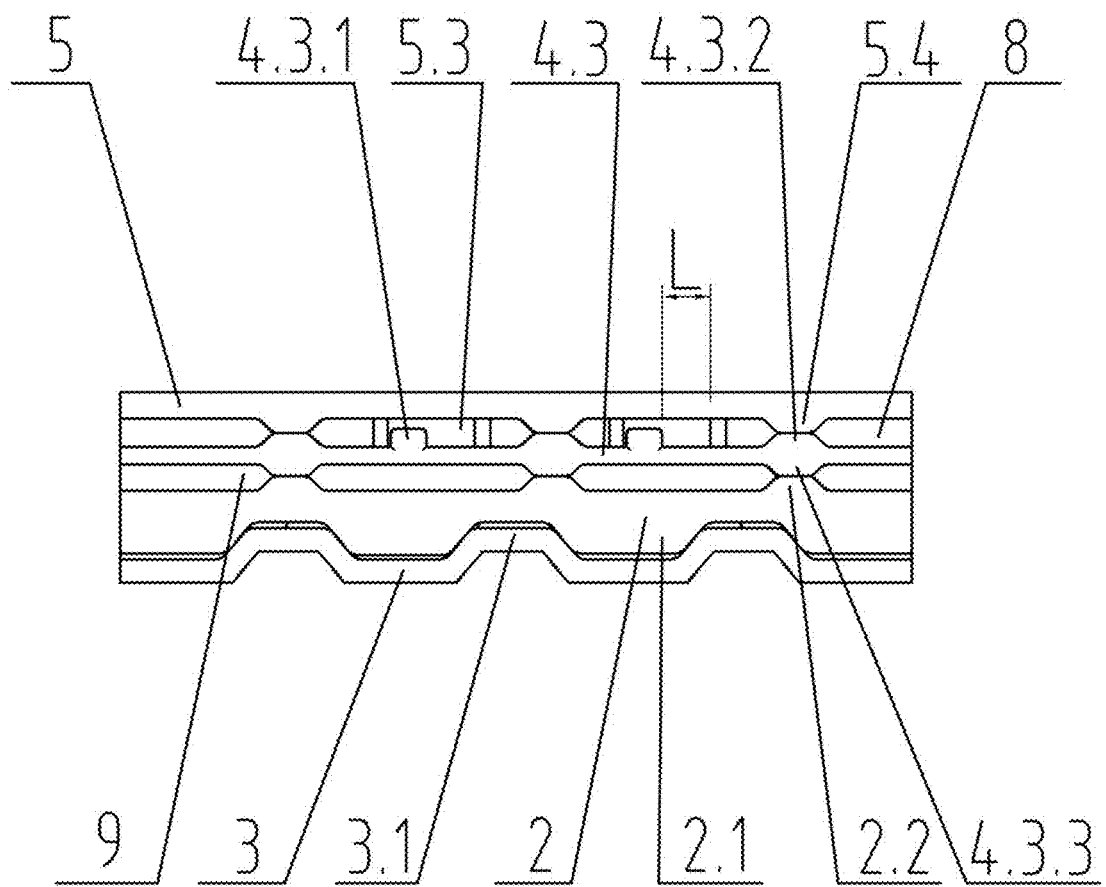
FIG. 10 is a schematic diagram illustrating an unfolding structure of the centralized connection piece, the drive gear, the seat and the base in an initial state according to the present disclosure.

As shown in FIGS. 3, 4, and 9, the centralized connection piece 5 may slide circumferentially along the drive gear 4.3, which, in the present embodiment, refers to the following process: a plurality of slide grooves 5.3 are disposed at positions of the mounting portion 5.1 corresponding to a plurality of limiting convex blocks; a plurality of slide blocks 4.3.1 matching with the slide grooves 5.3 are disposed on an inner circumferential wall of the drive gear 4.3; the slide blocks 4.3.1 of the drive gear 4.3 slide by a preset distance L along an inner circumference of the slide grooves 5.3 of the mounting portion 5.1, so as to achieve abutting release of a plurality of groups of limiting convex blocks. Further, the preset distance L is greater than a width of the first limiting convex blocks 5.4 and the second limiting convex blocks 4.3.2 (also greater than a width of the third limiting convex blocks 2.2 and the fourth limiting convex blocks 4.3.3) to achieve abutting release of each group of limiting convex blocks. Furthermore, the preset distance L is a distance that the slide blocks 4.3.1 slide from one end of the slide grooves 5.3 to the other end. As shown in FIG. 10, the preset distance L is equal to the width of the slide grooves 5.3 minus the width of the slide blocks 4.3.1. With the design of the slide grooves 5.3 and the slide blocks 4.3.1, the slide distance L that the drive gear 4.3 can slide along the circumference of the mounting portion 5.1 can be effectively limited to ensure stable slide connection between the drive gear and the mounting portion and prevent swing of the drive gear during slide. When the slide blocks slide to an end of the slide grooves 5.3, the abutting between first limiting convex blocks 5.4 and the second limiting convex blocks 4.3.2 can be released, providing space for lifting of the base 2 in a subsequent movement.

As shown in FIGS. 3, 4, and 9, in the present embodiment, a limiting seat cam assembly 5.5 is further disposed on the lower end surface of the limiting seat 5.2, and a drive gear cam assembly 4.3.4 matching the limiting seat cam assembly 5.5 is disposed on the drive gear 4.3. In an initial state, the limiting seat cam assembly 5.5 and the drive gear cam assembly 4.3.4 are in a separated state; after the drive gear 4.3 slides the preset distance L along a circumference of the mounting portion 5.1, the limiting seat cam assembly 5.5 and the drive gear cam assembly 4.3.4 are engaged with each other to lock the limiting seat 5.2 and the drive gear 4.3. During subsequent rotation of the drive gear 4.3, the limiting seat 5.2 and the drive gear 4.3 can be considered as integral.

As shown in FIG. 9, a plurality of first convex block assemblies 5.6 are disposed at a lower end of the mounting portion 5.1 of the centralized connection piece 5 and a plurality of second convex block assemblies 3.2 are disposed on an upper end of the seat 3. In an initial state and an electrically-driven state, under the action of the elastic force of the spring 7, the first convex block assemblies 5.6 and the second convex block assemblies 3.2 are always engaged with each other to lock the centralized connection piece 5 and the seat 3. When a manual torque is applied to the rear-view mirror, the elastic force of the spring 7 can be overcome, such that the first convex block assemblies 5.6 and the second convex block assemblies 3.2 are separated, thereby manually folding the rear-view mirror.

Figure 2:
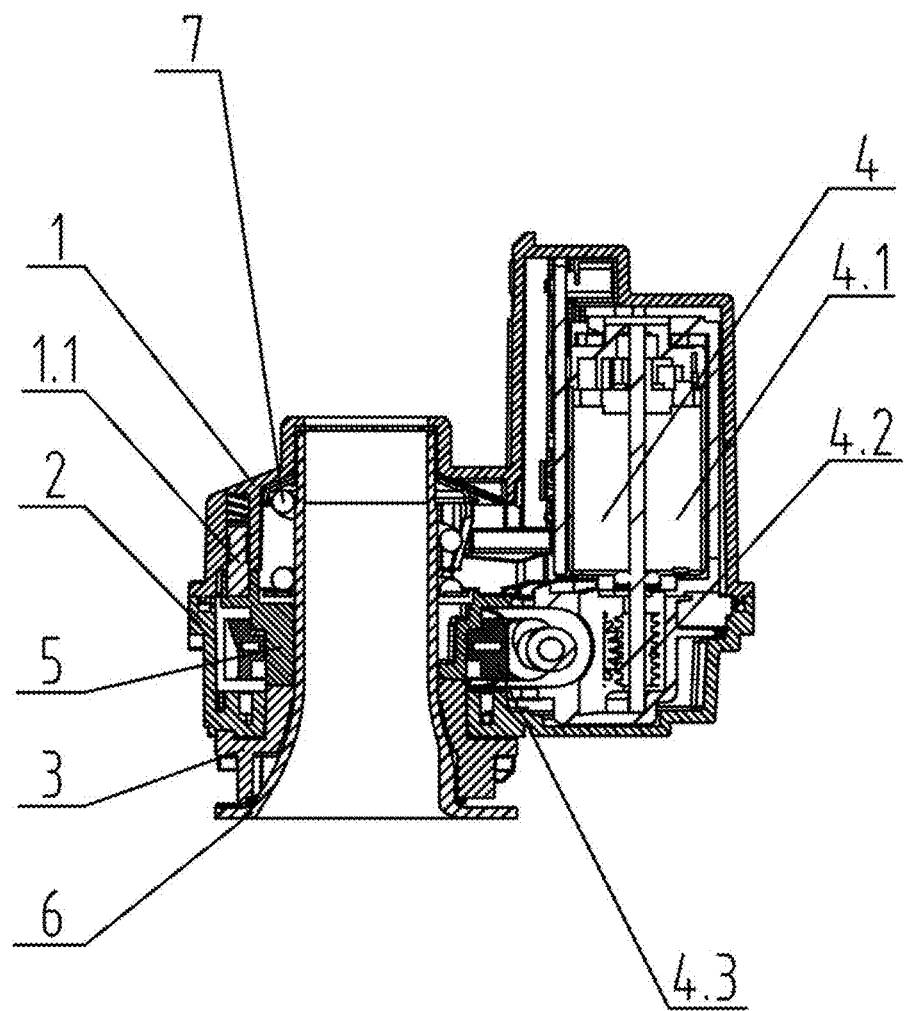
FIG. 2 is a sectional view illustrating an entire structure according to the present disclosure.

As shown in FIGS. 2 and 3, a positioning mechanism is disposed on an upper end of the centralized connection piece 5, and the positioning mechanism comprises a plurality of tilted positioning blocks 5.7 uniformly arranged along a circumference of the upper end of the centralized connection piece 5. A positioning groove 5.8 is disposed at an end of the positioning blocks 5.7, and elastic positioning columns 1.1 cooperating with the positioning grooves 5.8 to realize positioning are disposed in the inner chamber of the housing 1. The elastic positioning columns 1.1 act directly on the centralized connection piece 5 to achieve positioning effect on its rotational angle, so as to prevent the rear-view mirror from folding excessively. Better positioning effect can be achieved by the elastic positioning columns 1.1 and the positioning blocks 5.7, and the mounting space can be saved, making the entire product more compact.

As shown in FIGS. 10 to 14, in order to better describe the entire working process of the folding device while focusing on state change of key components, an assembly cooperation relationship formed by the centralized connection piece, the drive gear, the base, and the seat will be described in an unfolding manner.

As shown in FIGS. 9 and 10, initially, the rear-view mirror is in an unfolded state: the first limiting convex blocks 5.4 are abutted against the second limiting convex blocks 4.3.2, the first reserved gap 8 is present between the centralized connection piece 5 and the drive gear 4.3, the third limiting convex blocks 2.2 are abutted against the fourth limiting convex blocks 4.3.3, the second reserved gap 9 is present between the drive gear 4.3 and the base 2, the slide blocks 4.3.1 are located at an end of the slide grooves 5.3, and at this time, the base cam assembly 2.1 and the seat cam assembly 3.1 are engaged with each other; further, the limiting seat cam assembly 5.5 and the drive gear cam assembly 4.3.4 are in a separated state.

Figure 11:
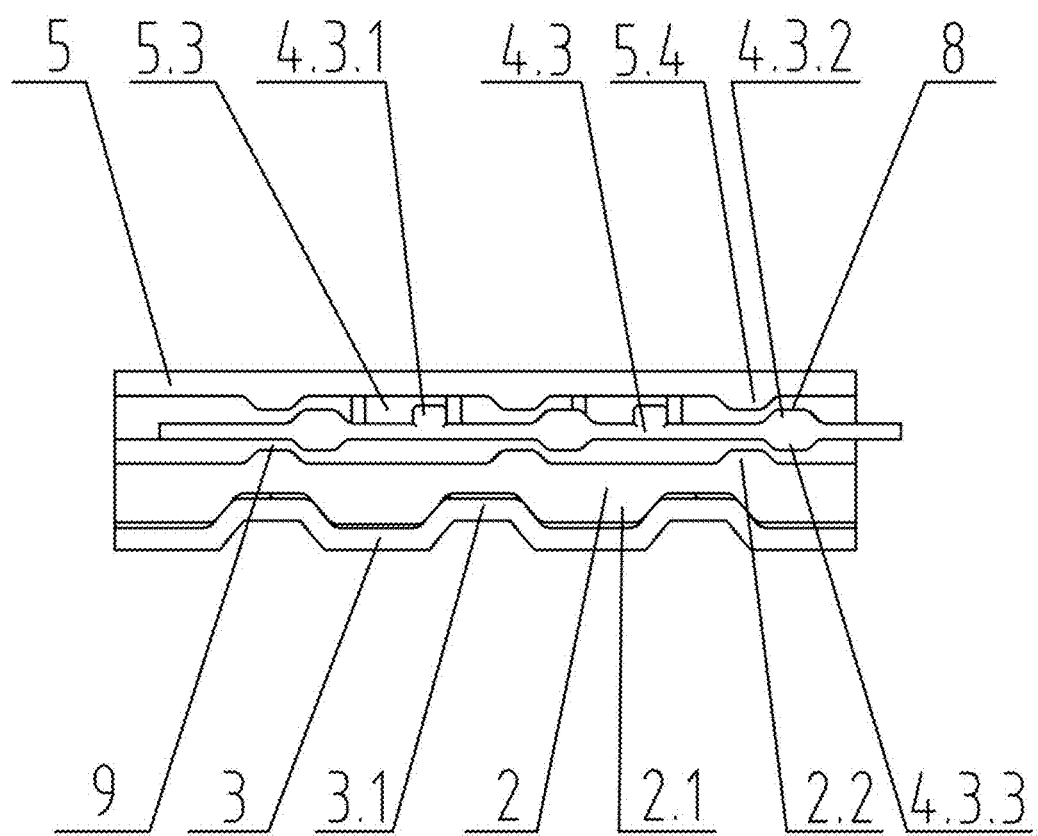
FIG. 11 is a schematic diagram illustrating an unfolding structure of the centralized connection piece, the drive gear, the seat and the base in a state 1 according to the present disclosure.

As shown in FIG. 11, during a folding process of the rear-view mirror, under the drive of the electric drive unit 4, the drive gear 4.3 slides a preset distance along a circumference of the mounting portion 5.1, that is, the slide blocks 4.3.1 slide from a side of the slide grooves 5.3 to the other side. The first limiting convex blocks 5.4 are disengaged with the second limiting convex blocks 4.3.2 and the third limiting convex blocks 2.2 are disengaged with the fourth limiting convex blocks 4.3.3. But, at this time, still, the first reserved gap 8 is present between the centralized connection piece 5 and the drive gear 4.3, and the second reserved gap 9 is present between the drive gear 4.3 and the base 2. The base cam assembly 2.1 and the seat cam assembly 3.1 are still in engaged state. At this time, the limiting seat cam assembly 5.5 and the drive gear cam assembly 4.3.4 are changed to an engaged state, and the limiting seat 5.2 and the drive gear 4.3 can be considered as integral.

Figure 12:
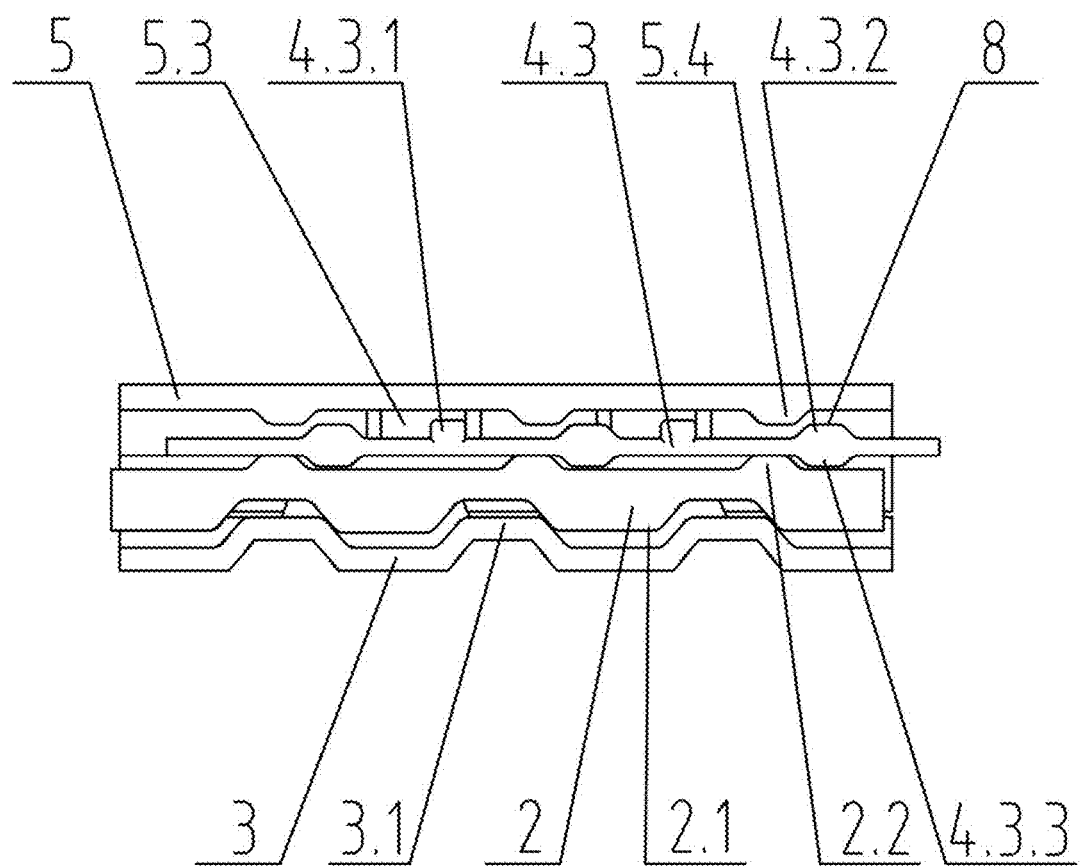
FIG. 12 is a schematic diagram illustrating an unfolding structure of the centralized connection piece, the drive gear, the seat and the base in a state 2 according to the present disclosure.

As shown in FIG. 12, the drive gear 4.3 drives the centralized connection piece 5 to rotate, and the base cam assembly 2.1 and the seat cam assembly 3.1 start to slide to lift up the base 2, gradually eliminating the second reserved gap 9.

Figure 13:
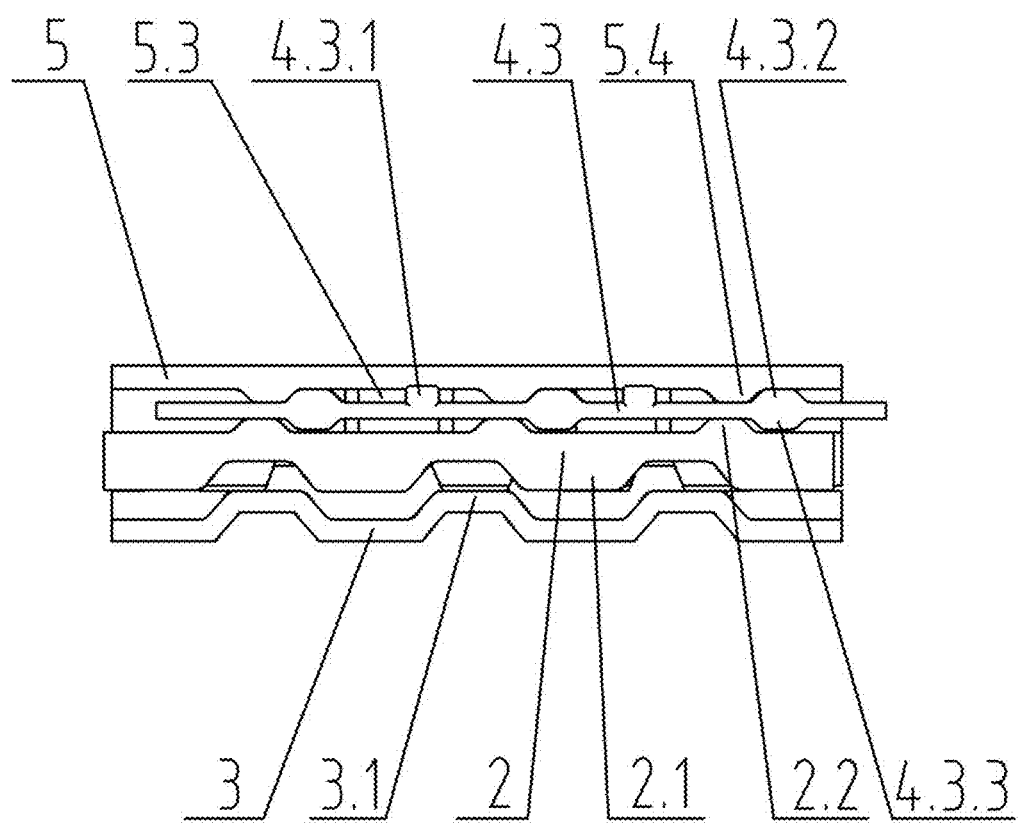
FIG. 13 is a schematic diagram illustrating an unfolding structure of the centralized connection piece, the drive gear, the seat and the base in a state 3 according to the present disclosure.

As shown in FIG. 13, the drive gear 4.3 continues driving the centralized connection piece 5 to rotate, and the base cam assembly 2.1 and the seat cam assembly 3.1 continue sliding, gradually eliminating the first reserved gap 8.

Figure 14:
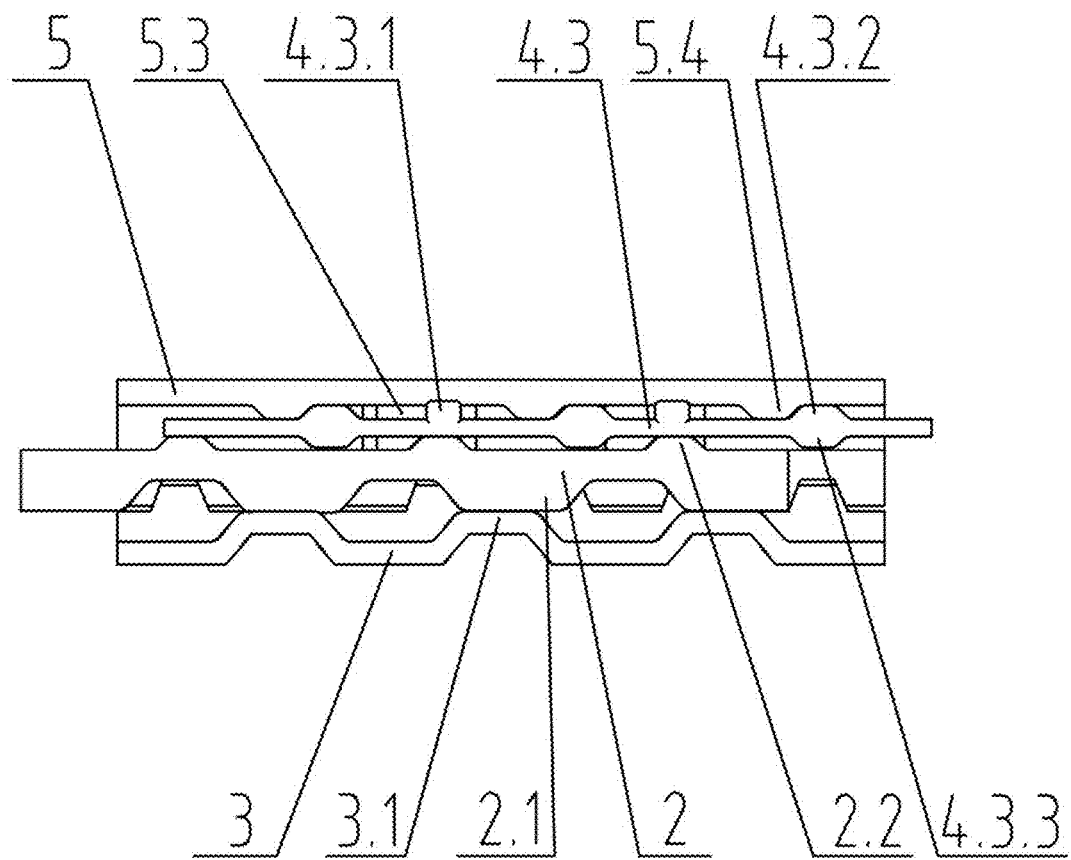
FIG. 14 is a schematic diagram illustrating an unfolding structure of the centralized connection piece, the drive gear, the seat and the base in a folding-to-position state according to the present disclosure.

As shown in FIG. 14, when the first reserved gap 8 is eliminated, the base cam assembly 2.1 runs completely on the seat cam assembly 3.1, completing lift of the base 2, and folding to position.

As shown in FIGS. 10 to 14, in order to more clearly show the change between structures, the slide blocks 4.3.1, the second limiting convex blocks 4.3.2 and the fourth limiting convex blocks 4.3.3 on the drive gear 4 are designed in separated manner, whereas, in FIG. 9, the slide blocks 4.3.1, the second limiting convex blocks 4.3.2 and the fourth limiting convex blocks 4.3.3 are designed integrally.

In the above entire folding working process, the drive gear bears a relatively small force, the motor requires a relatively small current, and the entire lift operation process of the base is relatively easy. Due to low bearing requirements for the drive gear, an ordinary plastic gear may be selected, helping lightness development of the product and reducing the costs.

Above descriptions are made only to preferred embodiments of the present disclosure, and shall not be understood as limiting of the claims. The present disclosure is not limited to the above embodiments and specific structures may be made thereto. Various changes made within the scope of protection claimed by independent claims of the present disclosure shall fall within the scope of protection of the present disclosure.

The invention claimed is:

1. An electric folding device for exterior rear-view mirror of a vehicle comprising:
    a housing, connected with a mirror base plate;
    a base, the base is fixedly connected with the housing, and a base cam assembly is disposed on a lower end surface of the base;
    a seat, the seat is fixed on a mirror bracket, and a seat cam assembly is disposed at an upper end of the seat; the base cam assembly and the seat cam assembly are in engaged state in an initial state;
    a mounting shaft, the mounting shaft is fixedly connected with the seat, and the base and the housing rotate around an axis of the mounting shaft relative to the seat, and a spring is disposed on the mounting shaft;
    an electric drive unit, comprising a motor, a transmission assembly and a drive gear disposed in an inner chamber of the housing; wherein the electric folding device further comprises:
    a centralized connection piece, and the centralized connection piece is provided with a mounting portion for the drive gear to slide circumferentially;
    a limiting seat is integrally disposed on an upper part of the mounting portion, the spring is abutted against an upper end of the limiting seat, and the drive gear is abutted between the limiting seat and the base; a first reserved gap is formed between the limiting seat and the drive gear with a plurality of limiting convex blocks abutting against each other; a second reserved gap is formed between the base and the drive gear with a plurality of limiting convex blocks abutting against each other; wherein the drive gear is configured to be driven by the electric drive unit to slide circumferentially along the mounting portion of the centralized connecting piece, the base cam is configured to be driven by the electric drive unit to slide relative to the seat cam assembly such that the second reserve gap is firstly eliminated and then the first reserve gap is eliminated until the base cam assembly is opposed to the seat cam assembly so as to upwardly lift the base, and a plurality of slide grooves are disposed at positions of the mounting portion corresponding to a plurality of limiting convex blocks, and a plurality of slide blocks matching the slide grooves are disposed on an inner circumferential wall of the drive gear; the slide blocks of the drive gear are configured to slide a preset distance along a circumference of the slide grooves of the mounting portion to achieve abutting release of several groups of limiting convex blocks.

2. The electric folding device for exterior rear-view mirror of a vehicle of claim 1, wherein the preset distance is greater than a width of each limiting convex block to help achieve abutting release of each group of limiting convex blocks.

3. The electric folding device for exterior rear-view mirror of a vehicle of claim 1, wherein a plurality of first limiting convex blocks are disposed in a spacing circumferentially on a lower end surface of the limiting seat, and a plurality of second limiting convex blocks are disposed correspondingly on an upper end surface of the drive gear; the first limiting convex blocks are abutted against the second limiting convex blocks so that a first reserved gap is formed between the limiting seat and the drive gear.

4. The electric folding device for exterior rear-view mirror of a vehicle of claim 2, wherein a plurality of third limiting convex blocks are disposed in a spacing circumferentially on an upper end surface of the base, and a plurality of fourth limiting convex blocks are disposed correspondingly on a lower end surface of the drive gear; the third limiting convex blocks are abutted against the fourth limiting convex blocks so that a second reserved gap is formed between the base and the drive gear.

5. The electric folding device for exterior rear-view mirror of a vehicle of claim 1, further comprising: a limiting seat cam assembly is further disposed on the lower end surface of the limiting seat, and a drive gear cam assembly matching the limiting seat cam assembly is disposed on the drive gear; the limiting seat cam assembly and the drive gear cam assembly are configured to be in a separated state; and the drive gear is configured to slide the preset distance along a circumference of the mounting portion, and the limiting seat cam assembly and the drive gear cam assembly are configured to engage with each other to lock the limiting seat and the drive gear in response to the drive gear sliding.

6. The electric folding device for exterior rear-view mirror of a vehicle of claim 1, wherein a plurality of first convex block assemblies are disposed at a lower end of the mounting portion of the centralized connection piece and a plurality of second convex block assemblies are disposed on an upper end of the seat; the first convex block assemblies and the second convex block assemblies are engaged with each other to lock the centralized connection piece and the seat in an initial state and an electrically-driven state.

7. The electric folding device for exterior rear-view mirror of a vehicle of claim 1, wherein a positioning mechanism is disposed on an upper end of the centralized connection piece, and the positioning mechanism comprises a plurality of tilted positioning blocks uniformly arranged along a circumference of the centralized connection piece; a positioning groove is disposed at an end of the positioning blocks, and elastic positioning columns cooperating with the positioning grooves to realize positioning are disposed in the inner chamber of the housing.

8. The electric folding device for exterior rear-view mirror of a vehicle of claim 1, wherein a plurality of first limiting convex blocks are disposed in a spacing circumferentially on a lower end surface of the limiting seat, and a plurality of second limiting convex blocks are disposed correspondingly on an upper end surface of the drive gear; the first limiting convex blocks are abutted against the second limiting convex blocks so that a first reserved gap is formed between the limiting seat and the drive gear.

9. The electric folding device for exterior rear-view mirror of a vehicle of claim 7, wherein a plurality of third limiting convex blocks are disposed in a spacing circumferentially on an upper end surface of the base, and a plurality of fourth limiting convex blocks are disposed correspondingly on a lower end surface of the drive gear; the third limiting convex blocks are abutted against the fourth limiting convex blocks so that a second reserved gap is formed between the base and the drive gear.

* * * * *